United States Patent
Kim et al.

(10) Patent No.: US 8,279,163 B2
(45) Date of Patent: Oct. 2, 2012

(54) IMAGE DISPLAY APPARATUS AND METHOD

(75) Inventors: Yun-Tae Kim, Suwon-si (KR); Du-Sik Park, Suwon-si (KR); Gee Young Sung, Daegu-si (KR); Dong Kyung Nam, Yongin-si (KR); Ju Yong Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 580 days.

(21) Appl. No.: 12/382,189

(22) Filed: Mar. 10, 2009

(65) Prior Publication Data

US 2010/0090940 A1    Apr. 15, 2010

(30) Foreign Application Priority Data

Oct. 15, 2008  (KR) .................. 10-2008-0101000

(51) Int. Cl.
    *G09G 3/36*    (2006.01)

(52) U.S. Cl. ..................... 345/102; 345/7; 359/630

(58) Field of Classification Search ............... 345/7–9, 345/87, 102; 359/237, 238, 630, 631
See application file for complete search history.

(56) References Cited

U.S. PATENT DOCUMENTS

| | | | | |
|---|---|---|---|---|
| 6,259,565 | B1 * | 7/2001 | Kawamura et al. | 359/630 |
| 7,413,328 | B2 * | 8/2008 | Dubin et al. | 362/471 |
| 2004/0196214 | A1 * | 10/2004 | Maguire, Jr. | 345/8 |
| 2009/0115783 | A1 * | 5/2009 | Eichenlaub | 345/421 |

FOREIGN PATENT DOCUMENTS

| | | |
|---|---|---|
| JP | 2006-259191 | 9/2006 |
| JP | 2006-259192 | 9/2006 |
| JP | 2007-065067 | 3/2007 |
| JP | 2007-272137 | 10/2007 |
| JP | 2007-288317 | 11/2007 |

* cited by examiner

*Primary Examiner* — Kimnhung Nguyen
(74) *Attorney, Agent, or Firm* — Staas & Halsey LLP

(57) ABSTRACT

An image display apparatus and method. At least one of a left eye image and a right eye image may be formed on a pixel representation unit at a predetermined frame rate. A light, emitted from a backlight module, may be converted into a directional light having at least one direction through synchronization with the predetermined frame rate. The directional light may be guided to the pixel representation unit.

14 Claims, 8 Drawing Sheets

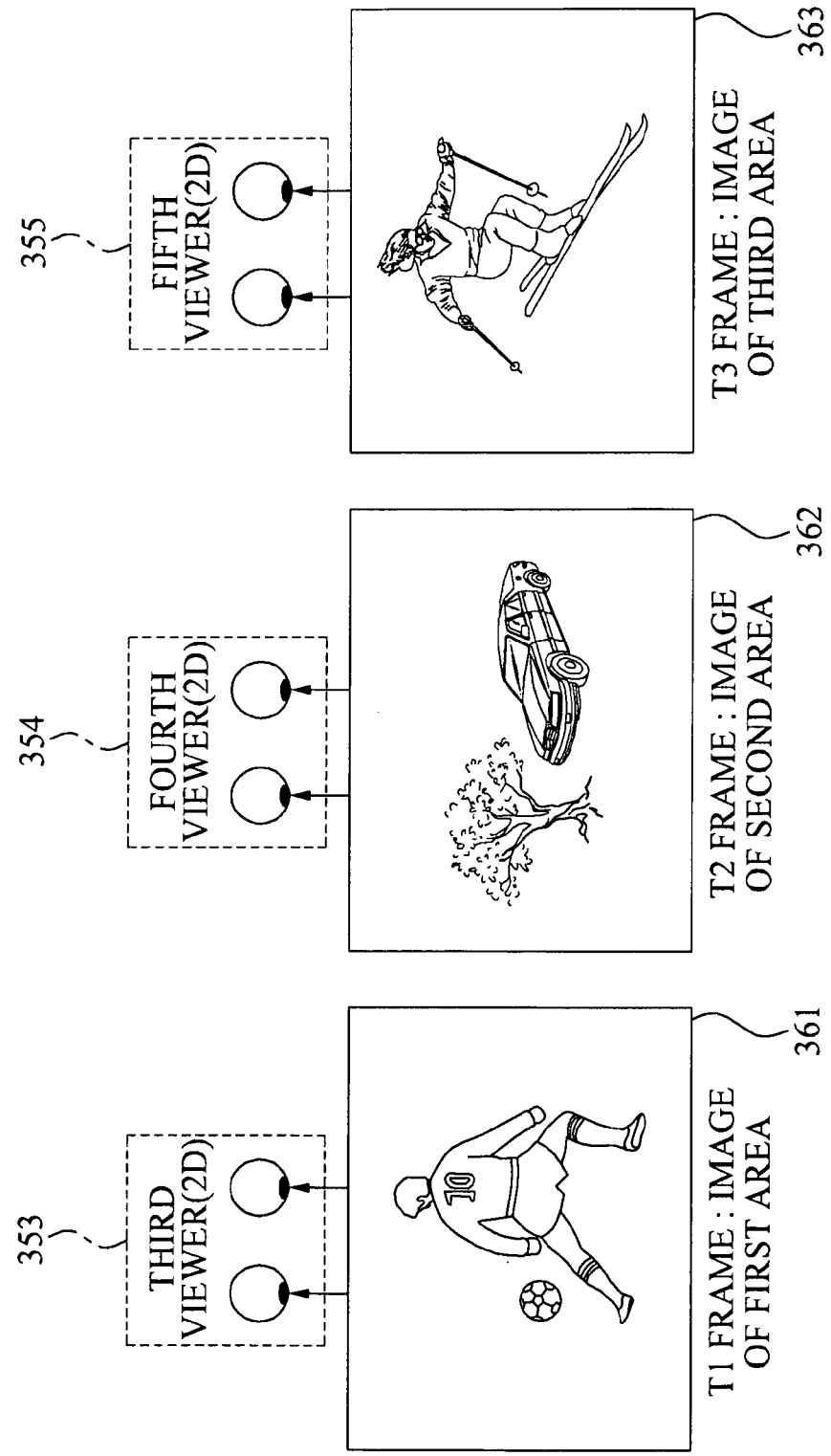

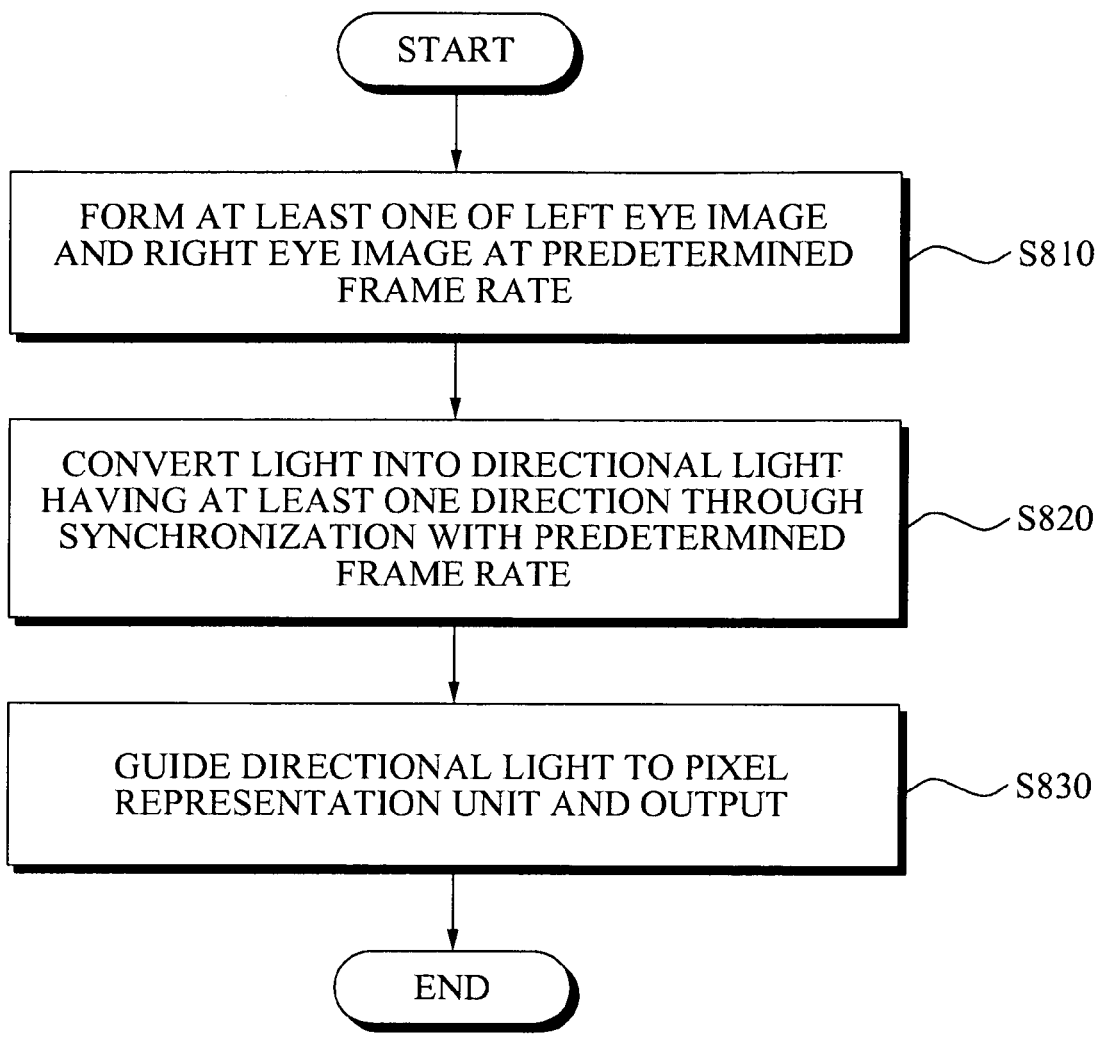

IMAGE DISPLAY APPARATUS AND METHOD

CROSS-REFERENCE TO RELATED APPLICATIONS

This application claims the benefit of Korean Patent Application No. 10-2008-0101000, filed on Oct. 15, 2008, in the Korean Intellectual Property Office, the disclosure of which is incorporated herein by reference.

BACKGROUND

1. Field

One or more embodiments of the present disclosure relate to an image display apparatus and method, and more particularly, to an image display apparatus and method that may simultaneously display a two-dimensional (2D) video and a stereoscopic video (hereinafter, "3D video").

2. Description of the Related Art

With interest in 3D video currently increasing, extensive research has been conducted on 3D video.

In general, a 3D effect may be obtained due to a time difference between left and right eyes of a human. Accordingly, a 3D video may be created based on such a characteristic. For example, a viewer may interpret a particular object as a 3D video by simultaneously displaying a left eye image, seen in a left eye of the viewer, and a right eye image seen in a right eye of the viewer.

Generally, 3D video provides the viewer with a sense of realism. However, when the viewer watches a 3D video for long durations, the viewer may begin to feel dizzy.

SUMMARY

In light of the problem just described, a viewer may desire to see either a 3D video or a general 2D video.

However, since currently commercialized image display apparatuses cannot simultaneously provide a 3D video and a 2D video, a user may not be provided with an image as desired. Also, some viewers may desire to simultaneously see a 3D video and a 2D video through a single image display apparatus.

Accordingly, a technology to simultaneously support a 3D video and a 2D video in a single image display apparatus is required.

One or more embodiments of the present disclosure may provide an image display apparatus and method that displays various types of images according to a particular direction through a directional light source, and thereby may simultaneously display a three-dimensional (3D) video and a two-dimensional (2D) video in the single image display apparatus depending on a location of a viewer.

Additional aspects and/or advantages will be set forth in part in the description which follows and, in part, will be apparent from the description, or may be learned by practice of the invention.

According to example embodiments, an image display apparatus may be provided. The image display apparatus includes a light source unit to emit a light using a backlight module, a pixel representation unit to form at least one of a left eye image and a right eye image at a predetermined frame rate, and an optical unit to convert the light into a directional light having at least one direction through synchronization with the predetermined frame rate, and guide the directional light to the pixel representation unit.

According to example embodiments, an image display method may be provided. The display method includes forming at least one of a left eye image and a right eye image on a pixel representation unit at a predetermined frame rate, converting a light, emitted from a backlight module, into a directional light having at least one direction through synchronization with the predetermined frame rate, and guiding the directional light to the pixel representation unit, and outputting an image.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates an example of videos seen by viewers, depending on locations of the viewers, through an image display apparatus, according to example embodiments; and FIG. 8 illustrates an image display method, according to example embodiments.

DETAILED DESCRIPTION

Figure 1:
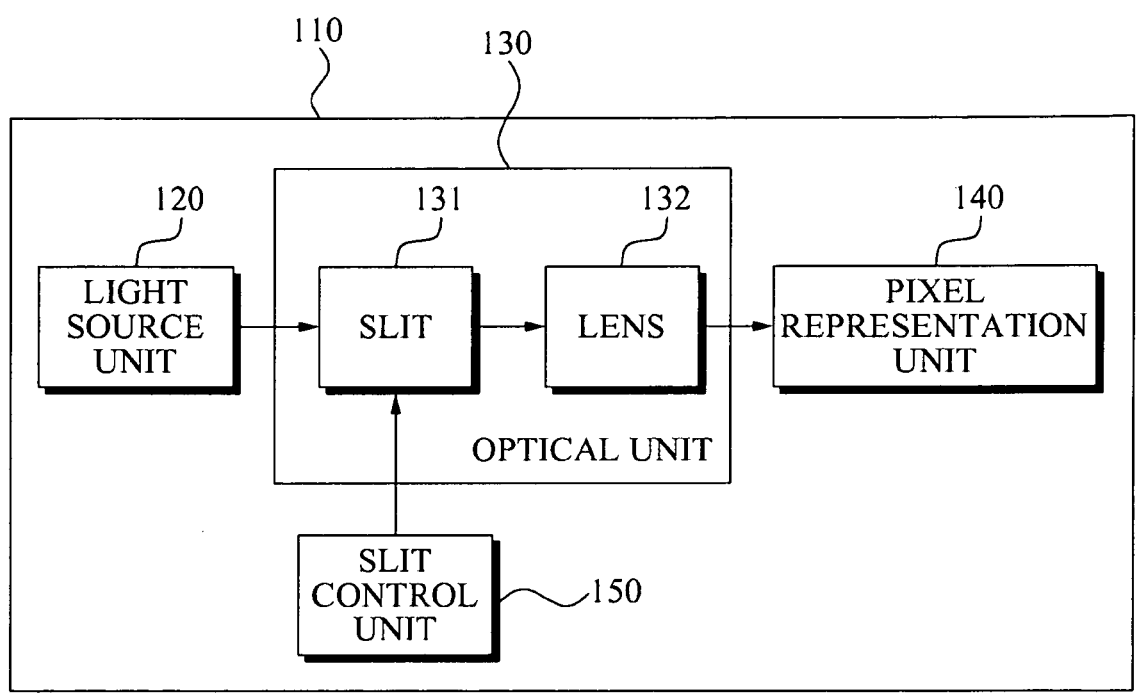
FIG. 1 illustrates an image display apparatus, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates an image display apparatus 110, according to example embodiments.

The image display apparatus 110 may include, for example, a light source unit 120, an optical unit 130, a pixel representation unit 140, and a slit control unit 150.

The light source unit 120 may emit light using a backlight module.

The pixel representation unit 140 may form at least one of a left eye image and a right eye image at a predetermined frame rate. Here, the left eye image may indicate an image seen in a left eye of a viewer, and the right eye image may indicate an image seen in a right eye of the viewer.

The optical unit 130 may convert the light into a directional light through synchronization with the predetermined frame rate, and guide the directional light to the pixel representation unit 140. The directional light may have at least one direction.

According to example embodiments, the optical unit 130 may be arranged between the light source unit 120 and the pixel representation unit 140.

According to example embodiments, the optical unit 130 may determine a direction of the directional light depending on a type of the image formed by the pixel representation unit 140. For example, when the pixel representation unit 140 forms a left eye image, the optical unit 130 may determine the direction of the directional light to be right. Also, when the pixel representation unit 140 forms a right eye image, the optical unit 130 may determine the direction of the directional light to be left.

According to example embodiments, the optical unit 130 may include a lens 132 to refract the light to the at least one direction.

Also, according to example embodiments, the optical unit 130 may include a slit 131. The slit 131 may guide the light to the lens 132 according to a direction where the light is refracted through the lens 132 through synchronization with the predetermined frame rate.

According to example embodiments, the image display apparatus 110 may further include a slit control unit 150. The slit control unit 150 may control opening and closing of the slit 131 depending on the direction in which the light is refracted through synchronization with the predetermined frame.

According to example embodiments, the lens 132 may be a lenticular lens.

Hereinafter, an operation of the image display apparatus 110 is described in detail with reference to FIG. 2.

Figure 2:
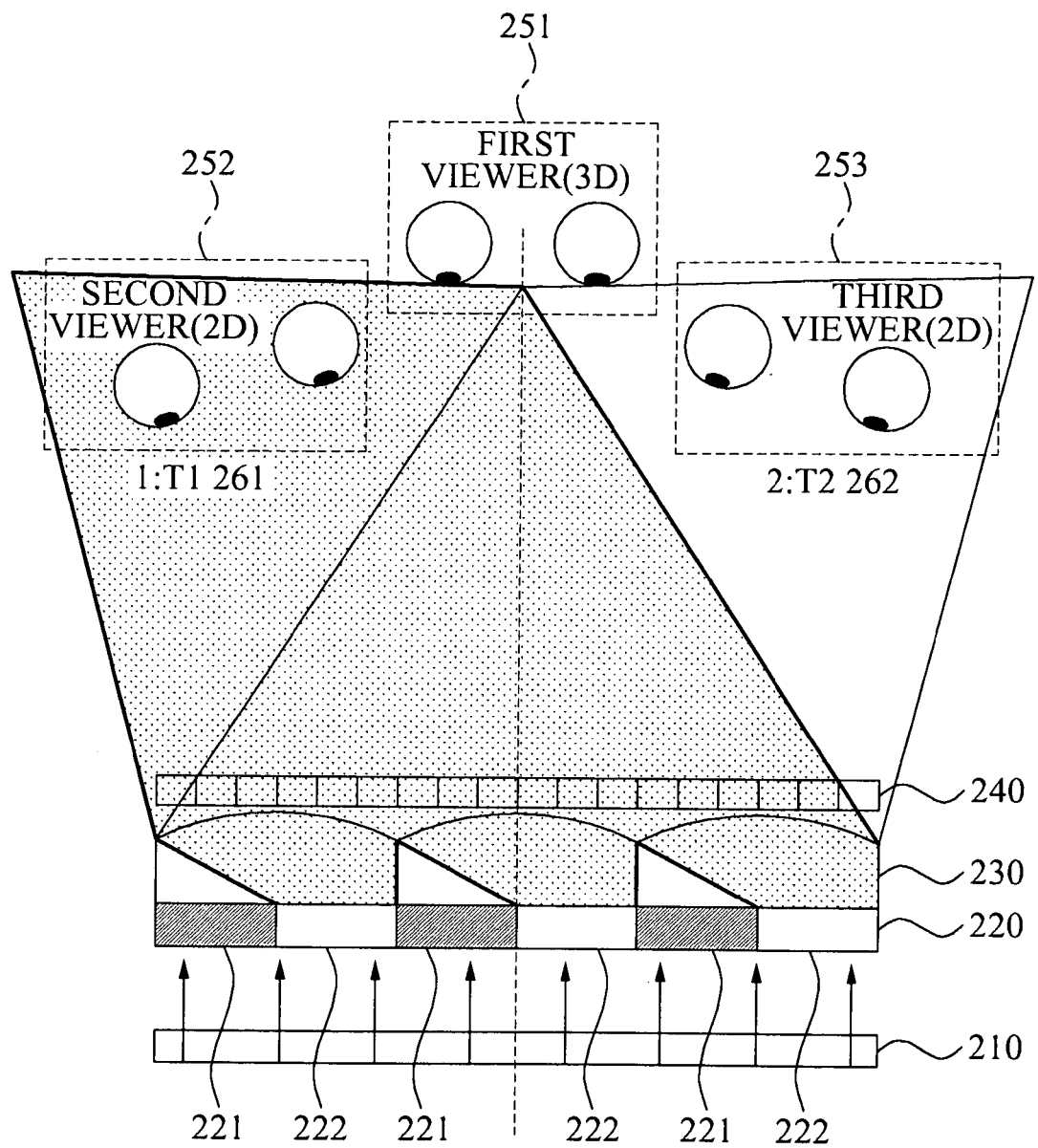
FIG. 2 illustrates an image display apparatus, according to example embodiments.

FIG. 2 illustrates an image display apparatus, according to example embodiments.

The image display apparatus, according to example embodiments, may include, for example, a light source unit 210, a slit 220, a lens 230, and a pixel representation unit 240.

According to example embodiments, the image display apparatus may further include a slit control unit, which is not illustrated in FIG. 2.

It may be assumed that the pixel representation unit 240 alternately forms a frame of a left eye image and a frame of a right eye image at 60 frames per second (fps). That is, it may be assumed that a frequency at which the frame of the left eye image and the frame of the right eye image are alternated is 120 Hz.

Also, it may be assumed that lens 230 may include three lenses, and the slit 230 may be divided into a left slit 221 and a right slit 222 for each of the three lenses of lens 230, as illustrated in FIG. 2.

When the light source unit 210 emits a light using a backlight module, the slit control unit may control the slit 220 to open and close the left slits 221 and the right slits 222 through synchronization with a frame rate of the left eye image and the right eye image. In this instance, the left eye image and the right eye image may be formed on the pixel representation unit 240.

That is, the slit control unit may control the slit 220 to alternately open and close the left slits 221 and the right slits 222 at 60 Hz.

When the pixel representation unit 240 forms the right eye image, the slit control unit may control the slit 220 to open the right slits 222 and close the left slits 221, and thereby may enable only light, which is emitted from the light source unit 210 and passes through the right slits 222, to be guided to the lens 230.

Here, according to example embodiments, the lens 230 may be a lenticular lens.

In this instance, the light passing the right slits 222 may be refracted to a left direction according to a characteristic of the lenticular lens, and the right eye image formed on the pixel representation unit 240 may be displayed on a first area 261.

Conversely, when the pixel representation unit 240 forms the left eye image, the slit control unit may control the slit 220 to open the left slits 221 and close the right slits 222, and thereby may enable only light, that is emitted from the light source unit 210 and passes through the left slits 221, to be guided to the lens 230.

In this instance, the light passing the left slits 221 may be refracted to a right direction, and the left eye image formed on the pixel representation unit 240 may be displayed on a second area 262.

That is, since the right eye image and the left eye image may be alternately displayed on the first area 261 and the second area 262, a first viewer 251, located between the first area 261 and the second area 262, may see a three-dimensional (3D) video.

Specifically, the right eye image may be displayed on the first area 261 at 60 fps, the left eye image may be displayed on the second area 262 at 60 fps, and a frame of the left eye image and a frame of the right eye image may be alternately displayed. Accordingly, the first viewer 251 may see the left eye image through a left eye of the first viewer 251, and see the right eye image through a right eye of the first viewer 251 at 120 fps, and thereby may recognize the left eye image and the right eye image as 3D video.

That is, the right eye image may be displayed on the first area 261 at a time T1, and the left eye image may be displayed on the second area 262 at a time T2. Accordingly, the right eye image may be seen in the right eye of the first viewer 251 at the time T1 and the left eye image may be seen in the left eye of the first viewer 251 at the time T2. Thus, the first viewer 251 may see the right eye image and the left eye image as 3D video.

In this instance, a second viewer 252 located in the first area 261 may see only a right eye image through both eyes of the second viewer 252 at 60 fps. Accordingly, the second viewer 252 may see a two-dimensional (2D) video as opposed to a 3D video.

Also, a third viewer 253 located in the second area 262 may see only a left eye image through both eyes of the third viewer 253 at 60 fps. Accordingly, the third viewer 253 may see a 2D video as opposed to a 3D video.

Accordingly, the image display apparatus may change a direction of light emitted from the light source unit 210, through the slit 220 and the lens 230 depending on the left eye image or the right eye image formed on the pixel representation unit 240. Thus, the 3D video and the 2D video may be simultaneously displayed, depending on a location of a viewer, in the single image display apparatus.

The operation of the image display apparatus has been described. According to example embodiments, however, a direction of a directional light may be varied more extensively than the examples described in FIG. 2. The image display apparatus, for example, may simultaneously provide a 3D video and a 2D video to viewers in various locations, which is described in greater detail with reference to FIGS. 3 through 7.

Figure 3:
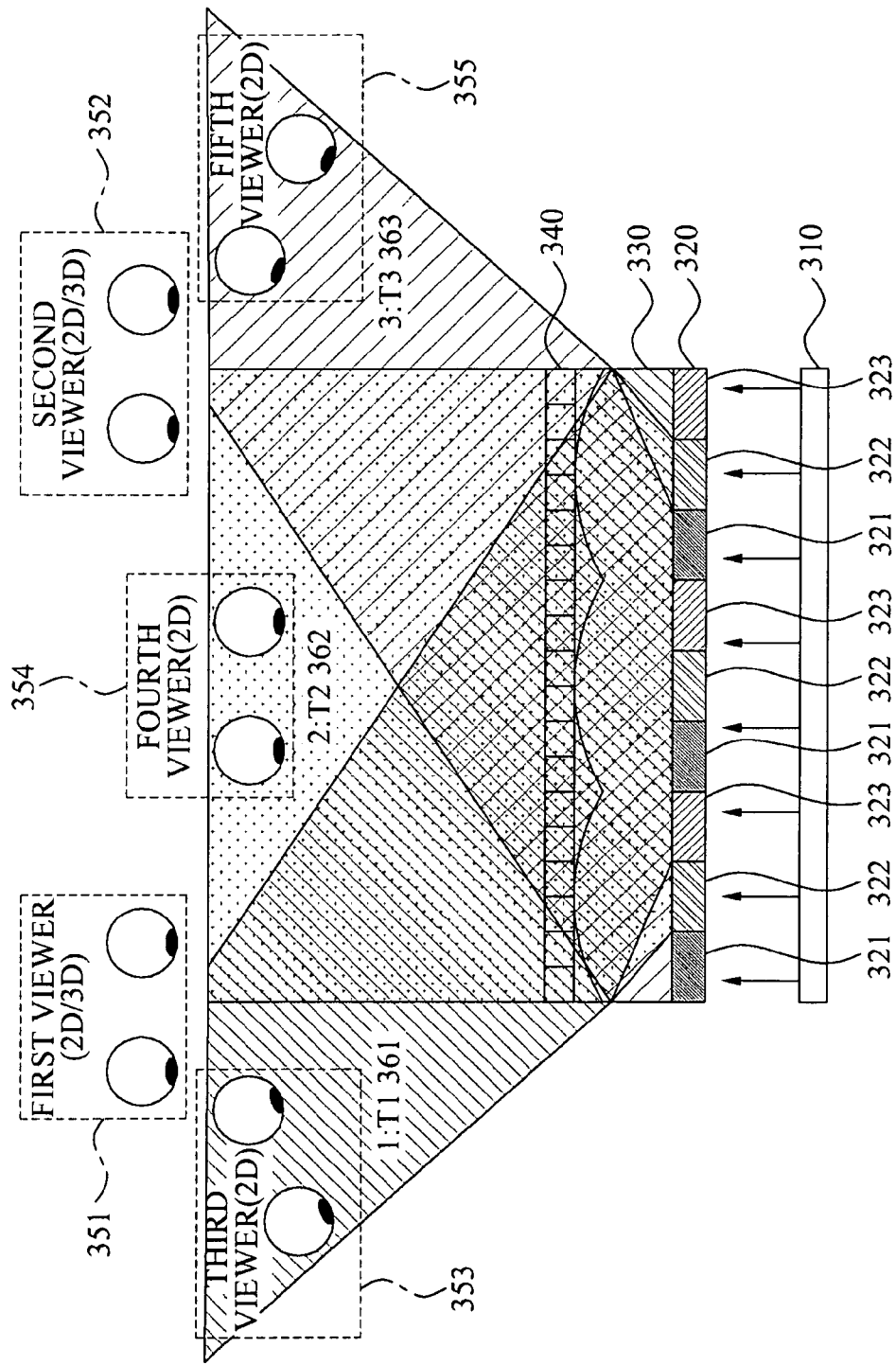
FIG. 3 illustrates an image display apparatus, according to example embodiments.

FIG. 3 illustrates an image display apparatus, according to example embodiments.

The image display apparatus may include, for example, a light source unit 310, a slit 320, a lens 330, and a pixel representation unit 340.

According to example embodiments, the image display apparatus may further include a slit control unit, which is not illustrated in FIG. 3.

It may be assumed that lens 330 may include three lenses, and the slit 320 may be divided into a left slit 321, a center slit 322, and a right slit 323 for each lens.

Also, it may be assumed that the pixel representation unit 340 alternately forms a frame of a video to be displayed on a first area 361, a frame of a video to be displayed on a second area 362, and a frame of a video to be displayed on a third area 363 at 60 fps.

Here, the video displayed on the first area 361 may be a right eye image, and the video displayed on the second area 362 may be a left eye image based on a first viewer 351.

However, the video displayed on the second area 362 may be a right eye image, and the video displayed on the third area 363 may be a left eye image based on a second viewer 352.

When the pixel representation unit 340 forms a video displayed on the first area 361, the slit control unit may control the slit 320 to open the right slits 323 and close the left slits 321 and the center slits 322.

Accordingly, a light emitted from the light source unit 310 may pass through only the right slits 323, the light passing through the right slits 323 may be refracted to a left direction through the lens 330, and thereby may be displayed on the first area 361.

When the pixel representation unit 340 forms the video displayed on the second area 362, the slit control unit may control the slit 320 to open the center slits 322 and close the left slits 321 and the right slits 323.

Accordingly, a light emitted from the light source unit 310 may pass through only the center slits 322, and the light passing through the center slits 322 may not be refracted through the lens 230 and may move straight. Thus, the light may be displayed on the second area 362.

Also, when the pixel representation unit 340 forms the video displayed on the third area 363, the slit control unit may control the slit 320 to open the left slits 321 and close the right slits 323 and the center slits 322.

Accordingly, a light emitted from the light source unit 310 may pass through only left slits 321, the light passing through the left slits 321 may be refracted to a right direction through the lens 330, and thereby may be displayed on the third area 363.

Here, since a frame from each of the video displayed on the first area 361, the video displayed on the second area 362, and the video displayed on the third area 363 may be alternately displayed at 60 fps, an image that may be seen by the first viewer 351, the second viewer 352, a third viewer 353, a fourth viewer 354, and a fifth viewer 355 may vary depending on the type of image.

For example, the first viewer 351 and the second viewer 352 may see a 3D video or a 2D video, or both, depending on each of the videos displayed on the first area 361, the second area 362, and the third area 363.

Hereinafter, examples of images that a viewer may see depending on the type of video displayed on each area are illustrated with reference to FIGS. 4 through 7.

Figure 4:
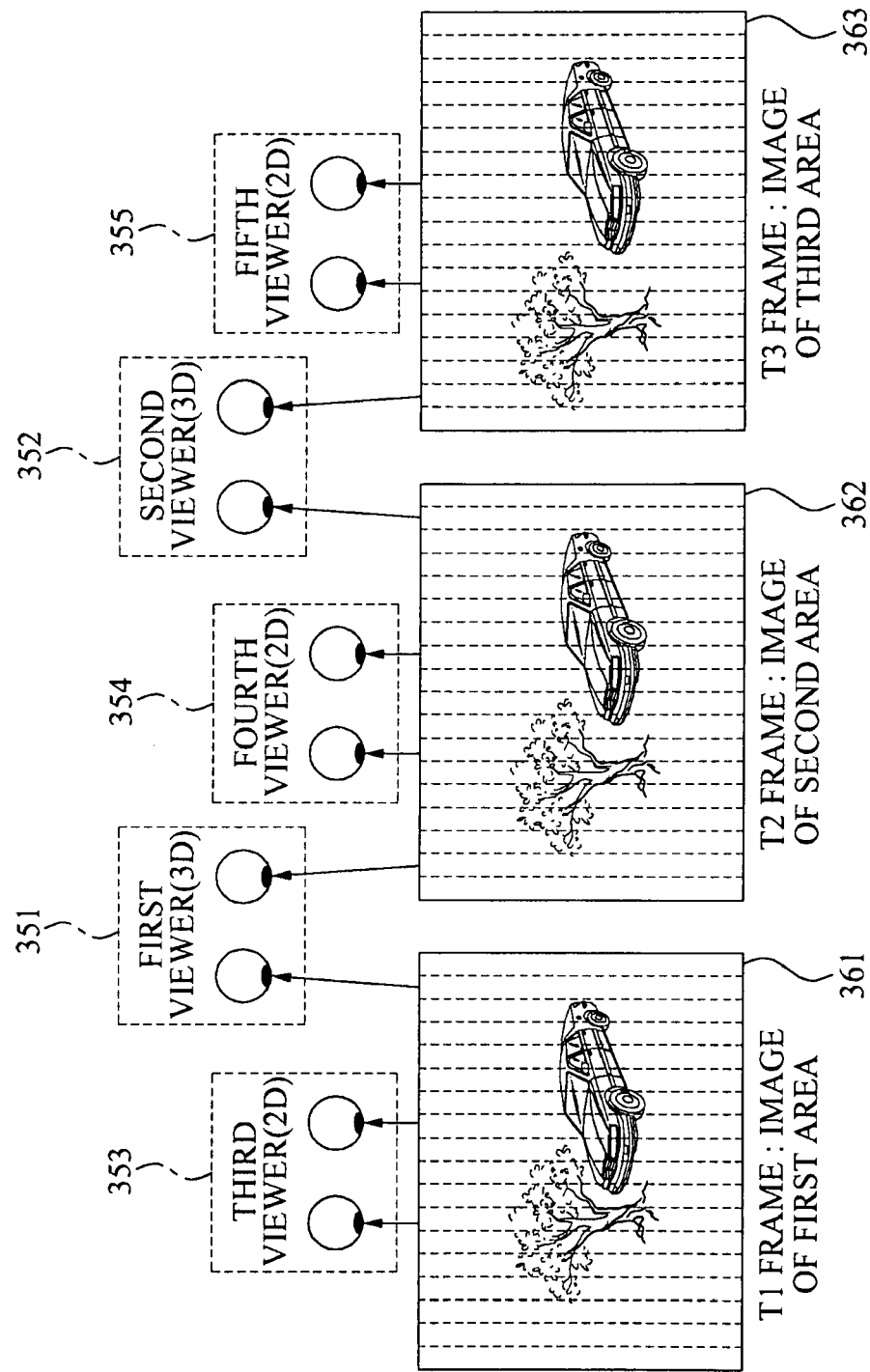
FIG. 4 illustrates an example of videos seen by viewers, depending on locations of the viewers, through an image display apparatus, according to example embodiments.

FIG. 4 illustrates an example of videos seen by viewers depending on locations of the viewers through an image display apparatus, according to example embodiments.

In FIG. 4, a first viewer 351 views a video displayed on a first area 361 as a right eye image and a video displayed on a second area 362 as a left eye image, while a second viewer 352 views the video displayed on the second area 362 as a right eye image and a video displayed on a third area 363 as a left eye image.

The first viewer 351 may see the video displayed on the first area 361 through a right eye of the first viewer 351, and may see the video displayed on the second area 362 through a left eye of the first viewer 351.

Also, since frames of the video displayed on the first area 361 and frames of the video displayed on the second area 362 may be alternately displayed at 60 fps, the first viewer 351 may see 3D video through the video displayed on the first area 361 and the video displayed on the second area 362.

The second viewer 352 may see the video displayed on the second area 362 through a right eye of the second viewer 352, and may see the video displayed on the third area 363 through a left eye of the second viewer 352.

Also, since frames of the video displayed on the second area 362 and frames of the video displayed on the third area 363 may be alternately displayed at 60 fps, the second viewer 352 may see a 3D video through the video displayed on the second area 362 and the video displayed on the third area 363.

In this instance, frames of each of the video displayed on the first area 361, the video displayed on the second area 362, and the video displayed on the third area 363 may not overlap. Accordingly, each of the first viewer 351 and the second viewer 352 may simultaneously see 3D video.

For example, when the frame of the video displayed on the first area 361, the frame of the video displayed on the second area 362, and the frame of the video displayed on the third area 363 are sequentially displayed at a time T1, a time T2, and a time T3, each of the first viewer 351 and the second viewer 352 may simultaneously see 3D video, since the frames of each of the video displayed on the first area 361, the video displayed on the second area 362, and the video displayed on the third area 363 do not overlap.

Since a third viewer 353 may see only the video displayed on the first area 361, the third viewer 353 may see 2D video.

Since a fourth viewer 354 may see only the video displayed on the second area 362, the fourth viewer 354 may see 2D video.

Since a fifth viewer 355 may see only the video displayed on the third area 363, the fifth viewer 355 may see 2D video.

According to example embodiments, the image display apparatus may refract a light, emitted from a light source unit 310, display a left eye image and a right eye image depending on a location of a viewer, and thereby may enable the viewer to see various types of images depending on the location of the viewer.

Figure 5:
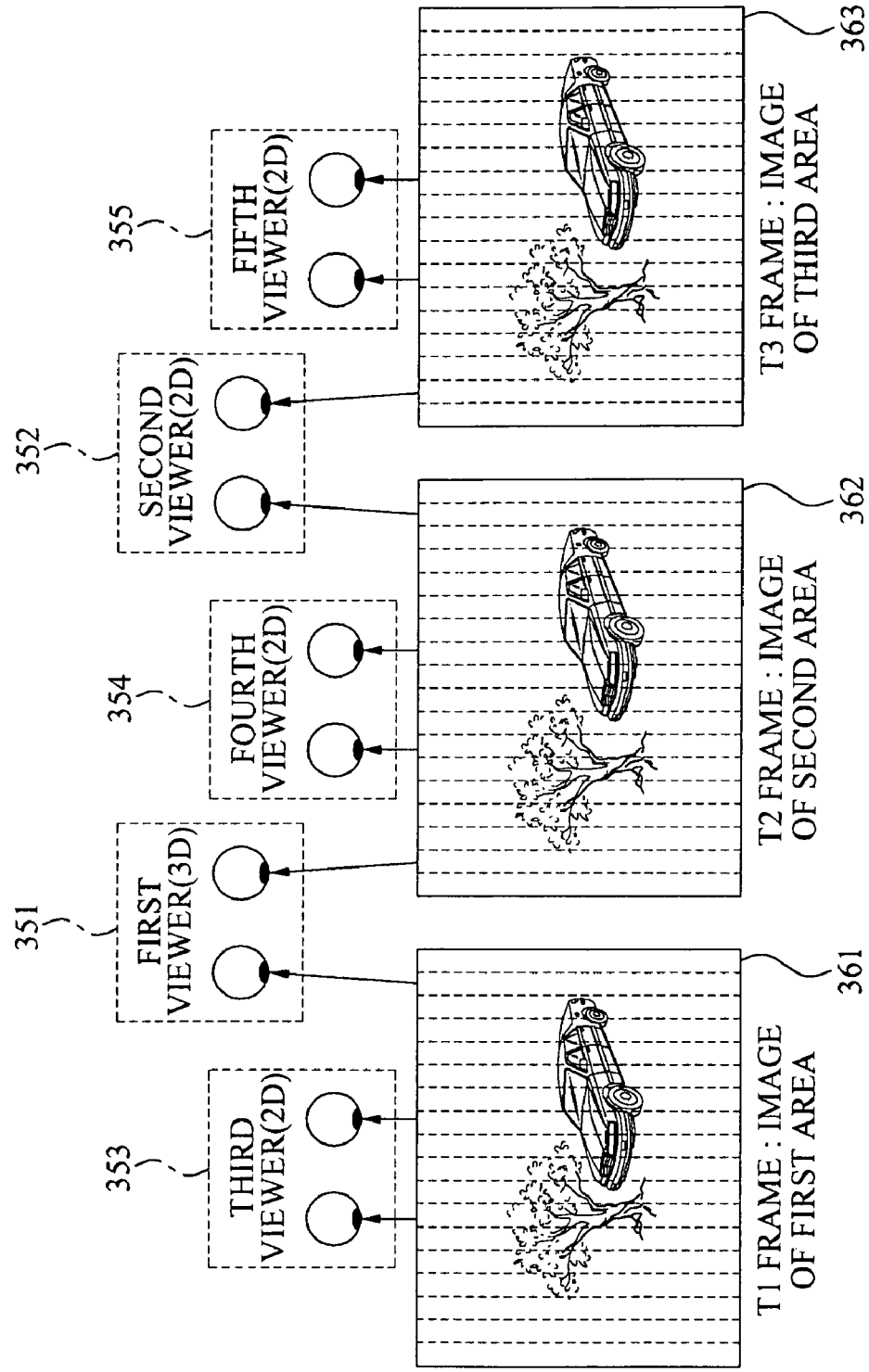
FIG. 5 illustrates an example of videos seen by viewers, depending on locations of the viewers, through an image display apparatus, according to example embodiments.

FIG. 5 illustrates an example of videos seen by viewers depending on locations of the viewers through an image display apparatus, according to example embodiments.

In contrast with FIG. 4, FIG. 5 illustrates an example of videos seen by various viewers, when a video displayed on a first area 361 is a right eye image and a video displayed on a second area 362 is a left eye image from the point of view of a first viewer 351, and when a video displayed on a third area 363 is identical to the video displayed on the second area 362.

The first viewer 351 may see the right eye image, that is, the video displayed on the first area 361 through a right eye of the first viewer 351, and see the left eye image, that is, the video displayed on the second area 362 through a left eye of the first viewer 351. Accordingly, the first viewer 351 may see 3D video through the video displayed on the first area 361 and the video displayed on the second area 362.

Also, a second viewer 352 may see the video displayed on the second area 362 through a right eye of the second viewer 352, and see the video displayed on the third area 363 through a left eye of the second viewer 352. However, since the video displayed on the second area 362 is identical to the video displayed on the third area 363, the second viewer 352 may see 2D video through the video displayed on the second area 362 and the video displayed on the third area 363.

Also, a third viewer 353 may see only the video displayed on the first area 361, and consequently the third viewer 353 may see 2D video from the video displayed on the first area 361.

Since a fourth viewer 354 may see only the video displayed on the second area 362, the fourth viewer 354 may see 2D video from the video displayed on the second area 362.

Since a fifth viewer 355 may see only the video displayed on the third area 363, the fifth viewer 355 may see 2D video from the video displayed on the third area 363.

Figure 6:
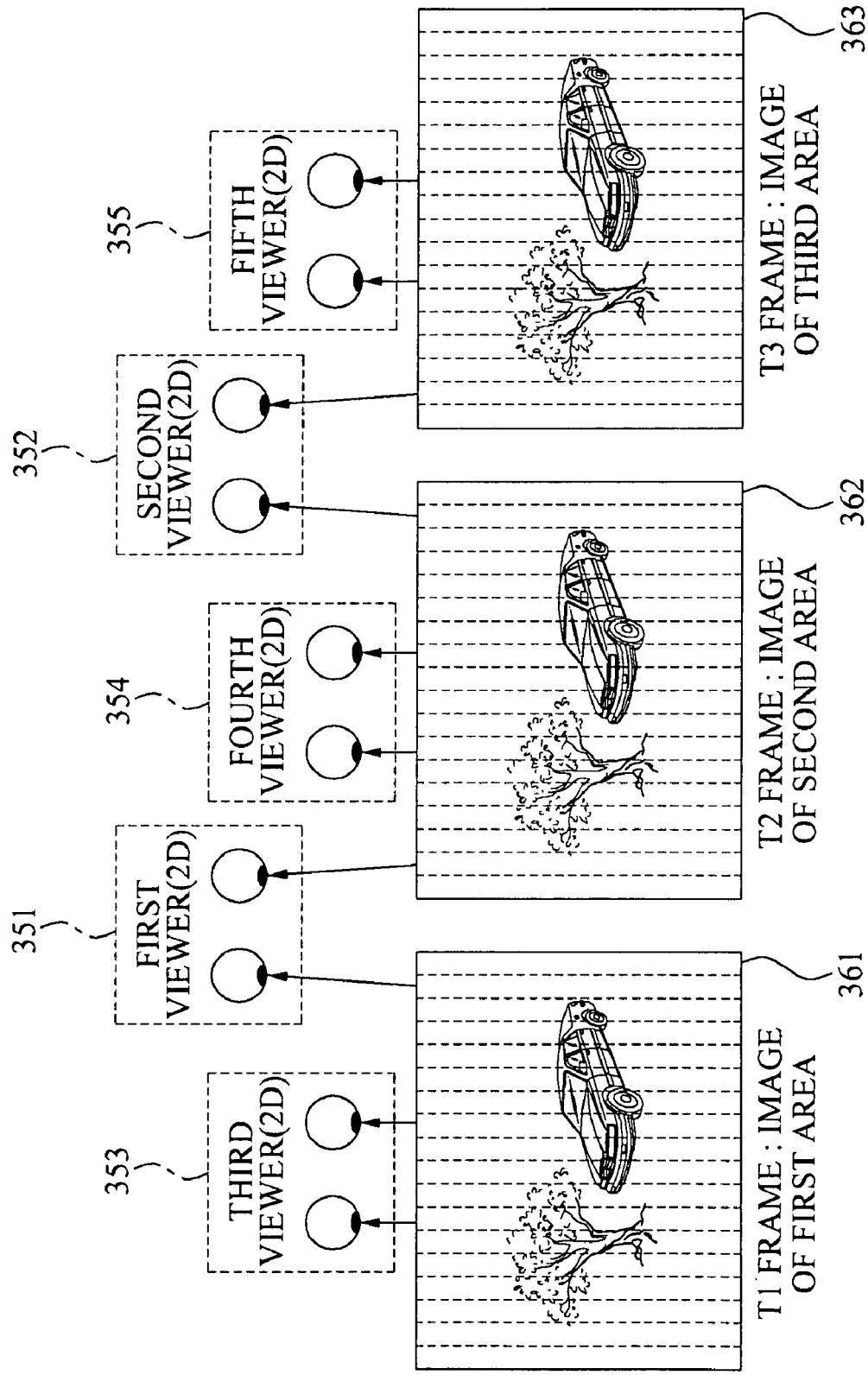
FIG. 6 illustrates an example of videos seen by viewers, depending on locations of the viewers, through an image display apparatus, according to example embodiments.

FIG. 6 illustrates an example of videos seen by viewers, depending on locations of the viewers, through an image display apparatus, according to example embodiments.

FIG. 6 illustrates an example of the videos seen by the viewers when a video to be displayed on a first area 361, a video to be displayed on a second area 362, and a video to be displayed on a third area 363, are the same.

A first viewer 351 may see the video displayed on the first area 361 through a right eye of the first viewer 351, and may see the video displayed on the second area 362 through a left eye of the first viewer 351. However, since the video displayed on the first area 361 is identical to the video displayed on the second area 362, the first viewer 351 may see 2D video through the video displayed on the first area 361 and the video displayed on the second area 362.

A second viewer 352 may see the video displayed on the second area 362 through a right eye of the second viewer 352, and may see the video displayed on the third area 363 through a left eye of the second viewer 352. However, since the video displayed on the second area 362 is identical to the video displayed on the third area 363, the second viewer 352 may see 2D video through the video displayed on the second area 362 and the video displayed on the third area 363.

Also, a third viewer 353 may see only the video displayed on the first area 361, and consequently the third viewer 353 may see 2D video from the video displayed on the first area 361.

Since a fourth viewer 354 may see only the video displayed on the second area 362, the fourth viewer 354 may see 2D video from the video displayed on the second area 362.

Since a fifth viewer 355 may see only the video displayed on the third area 363, the fifth viewer 355 may see 2D video from the video displayed on the third area 363.

Accordingly, as described with reference to FIGS. 4 through 6, the image display apparatus may enable the first viewer 351 and the second viewer 352 to see a 3D video or a 2D video, or both, depending on the type of image formed on a pixel representation unit 340.

FIG. 7 illustrates an example of videos seen by viewers depending on locations of the viewers through an image display apparatus, according to example embodiments.

FIG. 7 illustrates an example of the videos seen by the viewers when a video to be displayed on a first area 361, a video to be displayed on a second area 362, and a video to be displayed on a third area 363, are different from each other.

A first viewer and a second viewer (not illustrated) may see two different images through both eyes of each of the first viewer 351 and the second viewer 352, since the video displayed on the first area 361, the video displayed on the second area 362 and the video displayed on the third area 363 are different.

Also, a third viewer 353 may see the video displayed on the first area 361, a fourth viewer 354 may see the video displayed on the second area 362, and a fifth viewer 355 may see the video displayed on the third area 363.

That is, the third viewer 353, the fourth viewer 354, and the fifth viewer 355 may see different 2D images.

As described above, the image display apparatus displays different videos depending on a location of a viewer using directional light, and thus a 3D video and a 2D video may be simultaneously displayed in the single image display apparatus, and images different from each other may be simultaneously displayed.

FIG. 8 illustrates an image display method, according to example embodiments.

In operation S810, at least one of a left eye image and a right eye image may be formed at a predetermined frame rate using a pixel representation unit.

In operation S820, a light emitted from a backlight module may be converted into a directional light, having at least one direction, through synchronization with the predetermined frame rate.

According to example embodiments, a direction of the directional light may be determined depending on a type of the image formed on the pixel representation unit in operation S820.

In this instance, opening and closing of a slit may be controlled based on the determined direction, and the light may be guided to a lens through synchronization with the predetermined frame rate in operation S820. Also, the guided light may be refracted to the determined direction using the lens in operation S820.

According to example embodiments, the lens may be a lenticular lens.

In operation S830, the directional light may be guided to the pixel representation unit and may be output.

The image display method according to the above-described example embodiments may be implemented by computer-readable code recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image display apparatus, comprising:
a light source unit to emit a light using a backlight module;
a pixel representation unit to alternately form a left eye image and a right eye image at a predetermined frame rate such that the left eye image and the right eye image are displayed at different intervals in time from each other and in different respective areas; and
an optical unit to convert the light into a directional light having at least one direction through synchronization with the predetermined frame rate, and guide the directional light to the pixel representation unit.

2. The image display apparatus of claim 1, wherein the optical unit is arranged between the light source unit and the pixel representation unit.

3. The image display apparatus of claim 1, wherein the optical unit determines a direction of the directional light depending on a type of the image formed on the pixel representation unit.

4. The image display apparatus of claim 1, wherein the optical unit comprises:
  a lens to refract the light to the at least one direction; and
  a slit to guide the light to the lens according to a direction in which the light is refracted through the lens through synchronization with the predetermined frame rate.

5. The image display apparatus of claim 4, further comprising:
  a slit control unit to control opening and closing of the slit depending on the direction in which the light is refracted through synchronization with the predetermined frame rate.

6. The image display apparatus of claim 4, wherein the lens is a lenticular lens.

7. The image display apparatus of claim 1, wherein the pixel representation unit forms the left eye image at a first frame rate and alternately forms the right eye image at a second frame rate such that a frequency at which a frame of the left eye image and a frame of the right eye image are alternated is the predetermined frame rate.

8. The image display apparatus of claim 1, further comprising:
  a slit control unit to control opening of a left slit and closing of a right slit when the pixel representation unit forms the left eye image at the first frame rate.

9. The image display apparatus of claim 8, wherein the slit control unit further comprises controlling opening of a right slit and closing of a left slit when the pixel representation unit forms the right eye image at the second frame rate.

10. An image display method, comprising:
  alternately forming a left eye image and a right eye image on a pixel representation unit at a predetermined frame rate such that the left eye image and the right eye image are displayed at different intervals in time from each other and in different respective areas;
  converting a light, emitted from a backlight module, into a directional light having at least one direction through synchronization with the predetermined frame rate; and
  guiding the directional light to the pixel representation unit, and outputting an image.

11. The image display method of claim 10, wherein the converting comprises determining a direction of the directional light depending on a type of the image formed on the pixel representation unit.

12. The image display method of claim 11, wherein the converting comprises:
  controlling opening and closing of a slit through synchronization with the predetermined frame rate based on the determined direction, and guiding the light to a lens; and
  refracting the guided light to the determined direction using the lens.

13. The image display method of claim 12, wherein the lens is a lenticular lens.

14. A non-transitory computer-readable recording medium storing a program for implementing an image display method, comprising:
  alternately forming a left eye image and a right eye image on a pixel representation unit at a predetermined frame rate such that the left eye image and the right eye image are displayed at different intervals in time from each other and in different respective areas;
  converting a light, emitted from a backlight module, into a directional light having at least one direction through synchronization with the predetermined frame rate; and
  guiding the directional light to the pixel representation unit, and outputting an image.

* * * * *